Sept. 2, 1958      W. G. LUNDQUIST      2,850,226
GAS TURBINE ENGINE WITH AIR FLOW MODULATING MEANS
Filed Sept. 28, 1954      5 Sheets-Sheet 1
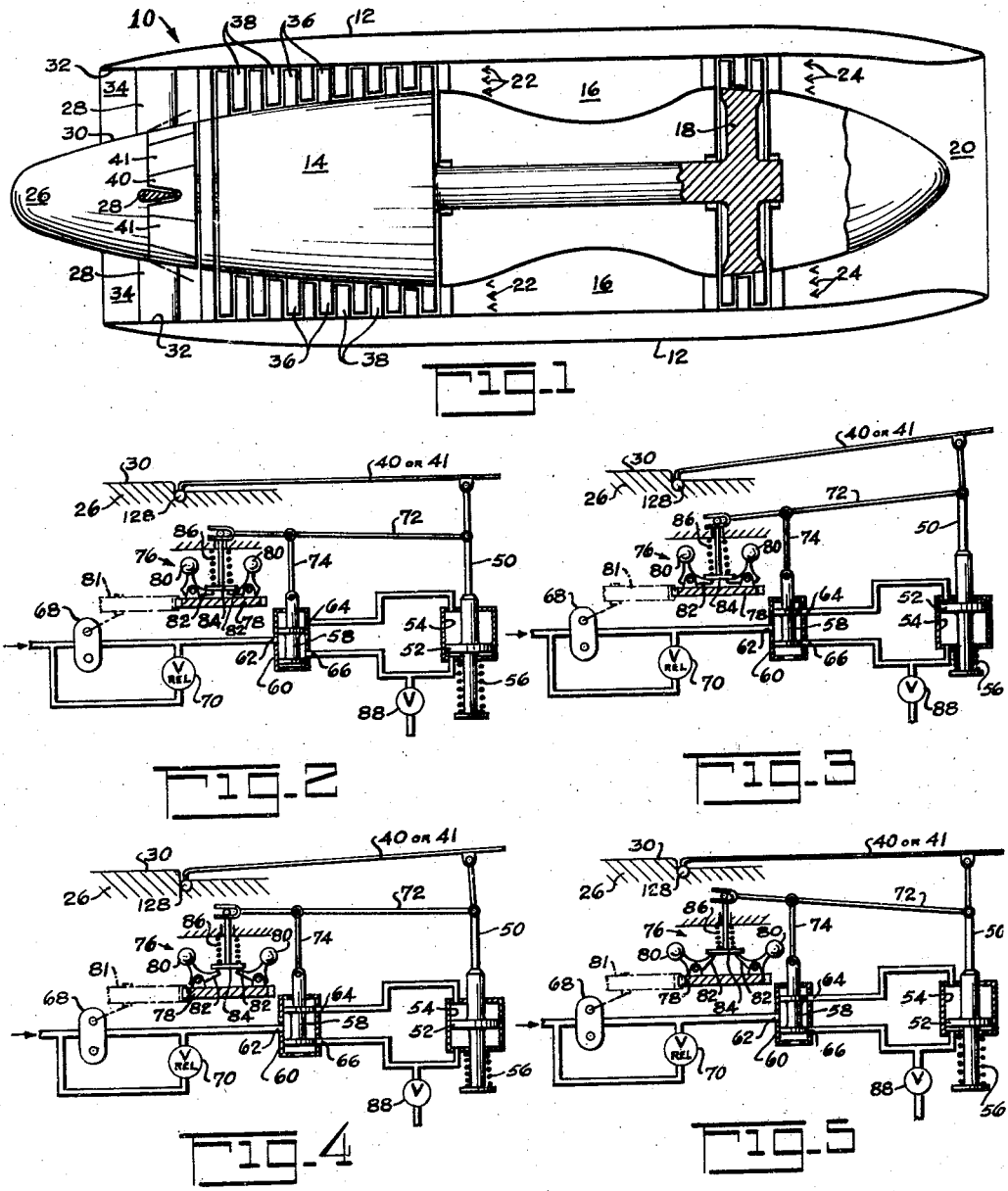
INVENTOR
WILTON G. LUNDQUIST
BY
ATTORNEY

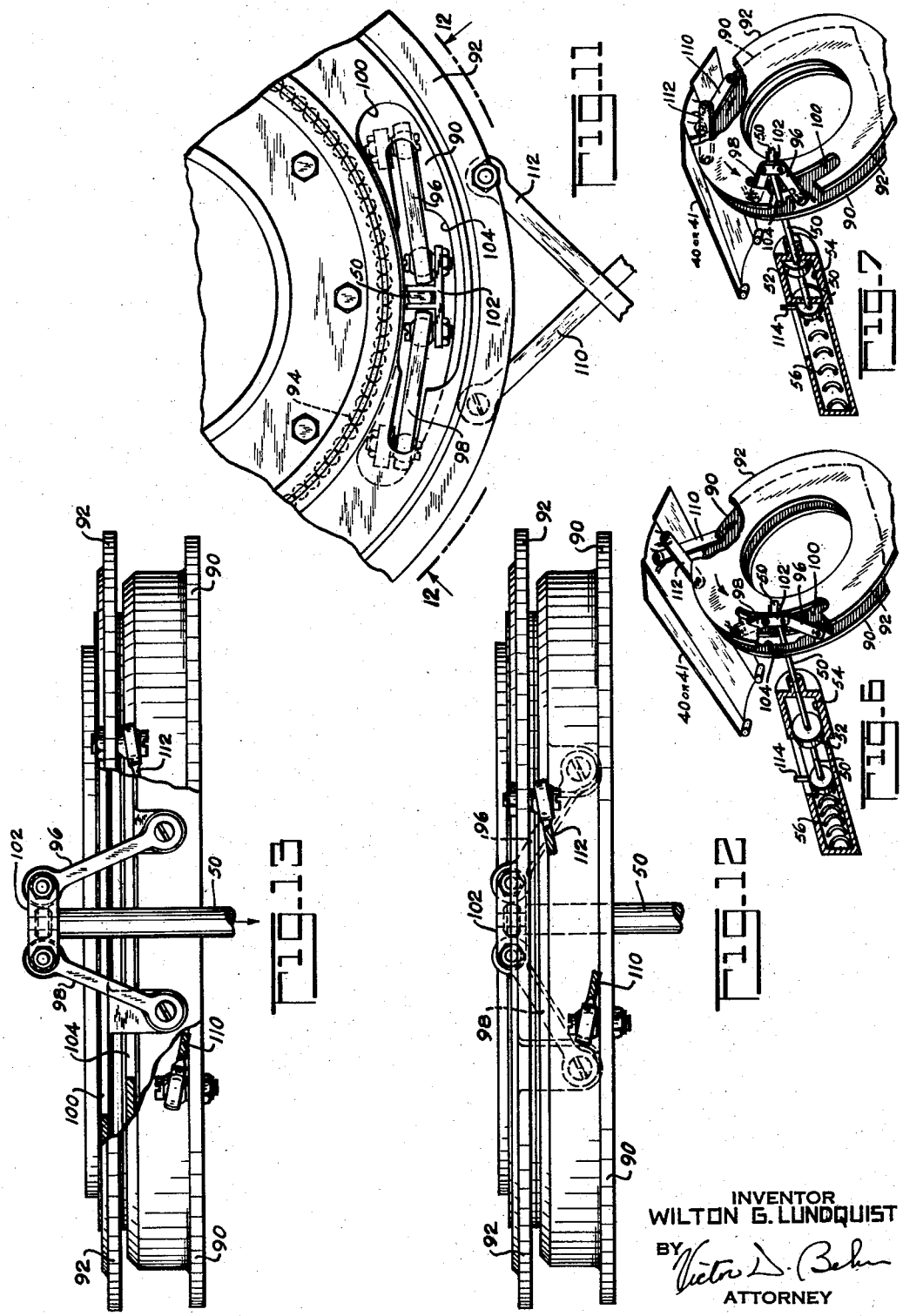

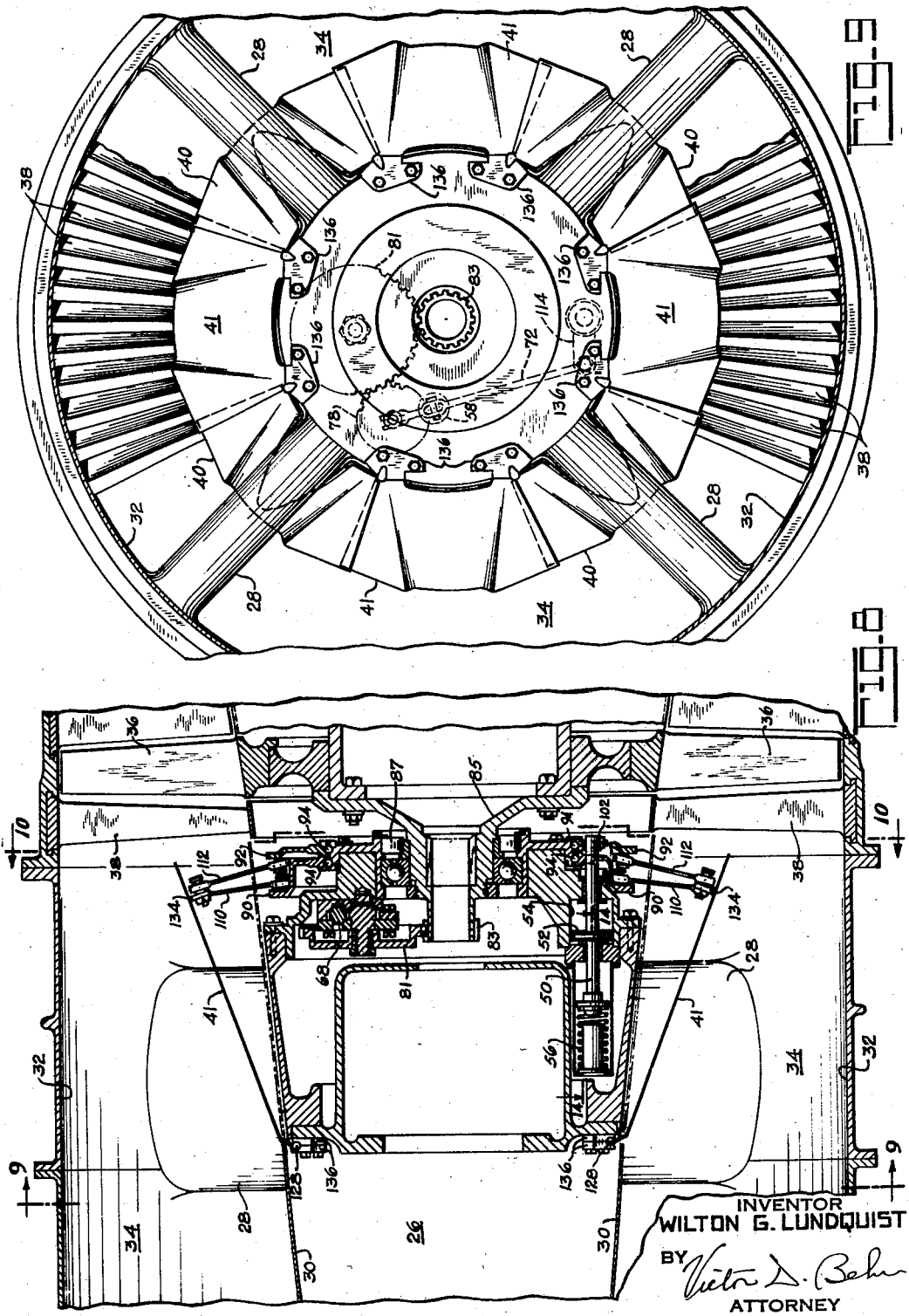

Sept. 2, 1958 W. G. LUNDQUIST 2,850,226
GAS TURBINE ENGINE WITH AIR FLOW MODULATING MEANS
Filed Sept. 28, 1954 5 Sheets-Sheet 4
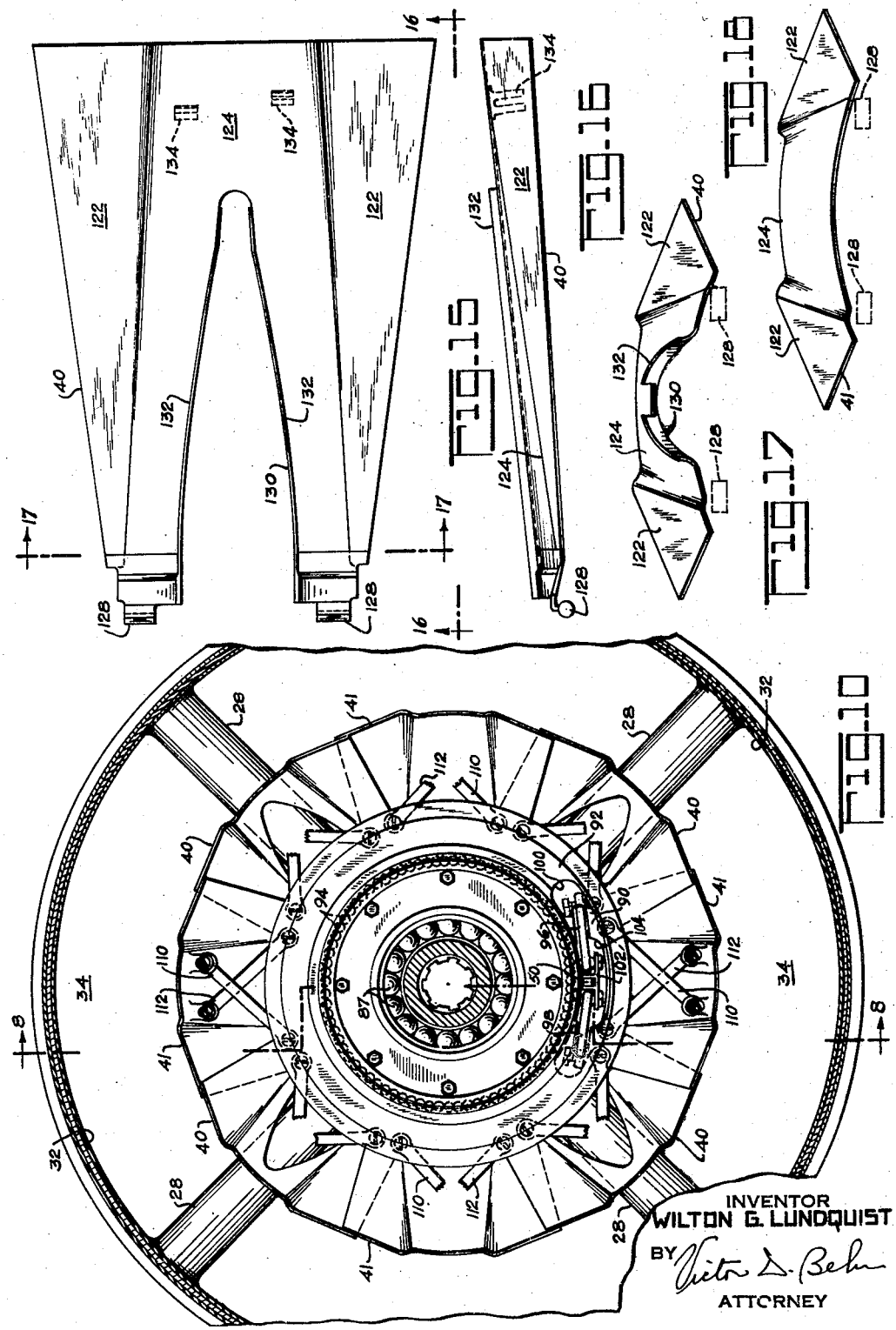
INVENTOR
WILTON G. LUNDQUIST
BY
ATTORNEY Sept. 2, 1958  W. G. LUNDQUIST  2,850,226
GAS TURBINE ENGINE WITH AIR FLOW MODULATING MEANS
Filed Sept. 28, 1954  5 Sheets-Sheet 5

INVENTOR
WILTON G. LUNDQUIST
BY
ATTORNEY

United States Patent Office 2,850,226
Patented Sept. 2, 1958

1

2,850,226

GAS TURBINE ENGINE WITH AIR FLOW
MODULATING MEANS

Wilton G. Lundquist, Hohokus, N. J., assignor to Curtiss-Wright Corporation, a corporation of Delaware Application September 28, 1954, Serial No. 458,932

6 Claims. (Cl. 230—114)

This invention relates to gas turbine engines and is particularly directed to means modulating the air flow into the engine for improving the operation of the compressor of such an engine.

The air compressors generally used in gas turbine engines operate satisfactorily over only a limited range of air flow therethrough for any given rotative speed of the engine. This is particularly true of an air compressor of the axial flow type and to a lesser extent of the centrifugal type air compressor. In the case of an axial flow compressor operating at a particular rotative speed, when the fluid flow through the compressor falls below a predetermined value at least the initial stage or stages of the compressor blades stall and at least under certain circumstances when a blade or blades of a particular stage stalls this stall condition rotates progressively around said stage. This latter type of stall is known as "rotating stall." As a result of any such stalling, a compressor surge condition, with resulting excessive blade vibration, may develop. The number of stages of the compressor blades of an axial flow compressor which must stall before the compressor surges will vary with the compressor and engine design. An air compressor of a gas turbine engine for aircraft propulsion is required to operate over a wide range of air flow therethrough as well as over a wide speed range. Hence an object of the present invention comprises the provision of novel means which is automatically operative to prevent the occurrence of compressor surge and/or stall conditions with resulting excessive blade vibration notwithstanding compressor operation over a wide rotative speed and air flow range.

The blades of an axial flow air compressor stall when the angle of attack of the air on the compressor blades exceeds a predetermined value, the magnitude of which depends on the design of the blades. The angle of attack on a particular compressor rotor blade increases and decreases with decrease and increase respectively in the circumferential velocity of said blade and/or in the rate of axial air flow past said compressor blade. Hence the blades of a compressor are most likely to stall when the compressor performance is low, for example when the compressor rotative speed is low. Also it has been found that the blades of the initial or upstream stage or stages of an axial flow compressor are the most likely to stall or said blades stall before the blades of the more downstream stages. A further object of the present invention comprises the provision of novel means for automatically decreasing the angle of attack of the air on the blades of at least the initial stage or stages of a compressor by increasing the rate of air flow over said blades when the compressor performance is low, for example when the rotative speed of the compressor is below a predetermined value. A still further object of the invention comprises the provision of baffle means which, for example at compressor rotative speeds below a predetermined value, is automatically operative to blank off the radially inner portion of the first stage compressor blades at said low compressor rotative speeds thereby increasing the air flow velocity over the remaining or radially outer portions of said blades.

Other objects of the invention will become apparent upon reading the annexed detailed description in connection with the drawing in which:

Fig. 1 is a schematic view of a gas turbine engine embodying the invention;

Figs. 2, 3, 4 and 5 are schematic views of the automatically operable air baffle control mechanism illustrating the condition of said mechanism at different positions of the air baffles;

Fig. 6 is a schematic perspective view illustrating the air baffle operating mechanism when the air baffles are in their extended position;

Fig. 7 is a view similar to Fig 6 but with the air baffles in their retracted position;

Fig. 8 is an enlarged axial sectional view of a portion of the air inlet portion of the engine taken along line 8—8 of Fig. 10 and illustrating the air baffle means embodying the invention;

Figure 19:
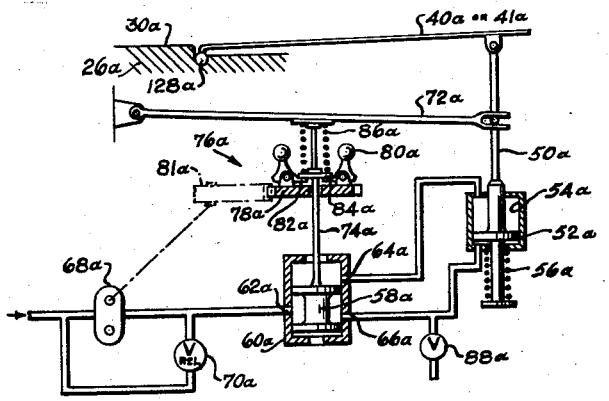
Figure 20:
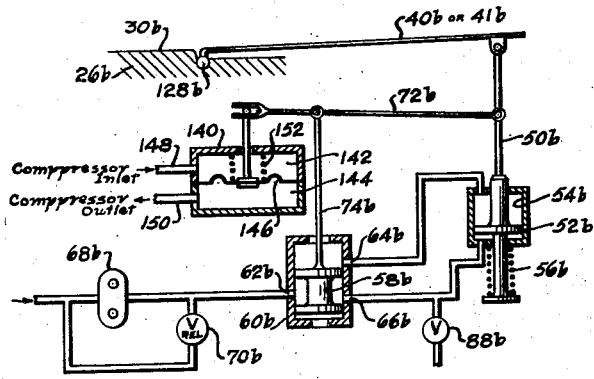
Figure 14:
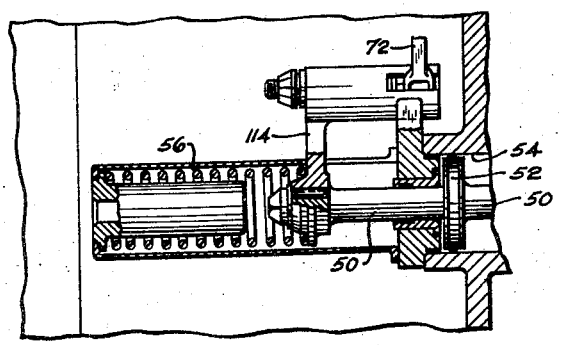

Figs. 9 and 10 are views taken along lines 9—9 and 10—10 respectively of Fig. 8;

Fig. 11 is an enlarged view of a portion of Fig. 10;

Fig. 12 is a view taken along line 12—12 of Fig. 11;

Fig. 13 is a view similar to Fig. 12 but illustrating the mechanism when the air baffles are retracted;

Fig. 14 is a sectional view taken along line 14—14 of Fig. 8;

Fig. 15 is a plan view of one of the baffle flap members having an opening for a strut;

Figs. 16 and 17 are views taken along lines 16—16 and 17—17 respectively of Fig. 15;

Fig. 18 is a view similar to Fig. 17 but illustrating a flap member having no strut receiving opening; and Figs. 19 and 20 are schematic views similar to Fig. 2 but illustrating modified forms of the air baffle control mechanism.

Referring first to Fig. 1 of the drawing, a turbo-jet power plant 10 is schematically illustrated as comprising a housing 12 within which an axial flow multi-stage air compressor 14, a combustion chamber 16 and a turbine 18 are mounted. The turbine 18 is drivably connected to the compressor 14 for supplying the combustion chamber 16 with compressed air for combustion with fuel supplied to said chamber by burner apparatus 22. The combustion gases and excess air discharging from the combustion chamber 16 drive the turbine 18 and then discharge rearwardly through a nozzle 20 to provide the power plant with forward propulsive thrust. An afterburner 24 may also be provided in the exhaust passage between the turbine 18 and nozzle 20. A nose section or centerbody 26 is co-axially supported at the forward end of the power plant 10 by struts 28 so that the annular surface 30 of the centerbody 26 and the inner annular surface 32 of the housing 12 form inner and outer annular walls of an annular air inlet passage 34 for the compressor 14. This annular passage 34 continues downstream between the compressor rotor and the housing wall 32 with the compressor rotor blades 36 and stator blades 38 extending across said passage. The structure of the power plant 10 so far described is conventional.

The blades of the initial stage or stages of an axial flow compressor have a tendency to stall at rotative speeds below the design speed of the compressor. Such stalling may result in a compressor surge condition with resulting excessive vibration of the blades of said initial compressor blade stages. This tendency of the compressor blades of the initial stages to stall can be minimized by increasing the flow velocity of the air past said blades. For this purpose the portion of the inner surface of the annular air inlet passage 34 is formed by a plurality of circumferentially overlapping flap members 40 and 41 pivotally mounted at their upstream ends on the nose section 26. The flap members 40 and 41 are identical except the flap members 40 have openings therethrough to accommodate the struts 28 as hereinafter more fully described. These flap members 40 and 41 are illustrated in their retracted positions in Fig. 1 (full lines). In their retracted positions, the flap members form a parallel continuation of the inner wall 30 of the annular air inlet passage 34. The flap members 40 and 41 can be swung radially outwardly about their pivotally supported ends to an extended position (indicated by dot and dash lines in Fig. 1). In their extended positions the flap members form an annular conical surface which flares part way across the annular air inlet passage 34 to block the radially inner portion of said annular passage immediately upstream of the compressor blades. With this construction, air flow to the radial inner portion of the first or upstream compressor blade stage is blocked by the flap members 40 and 41 when said members are extended whereby said members function as an annular air baffle for the radially inner portion of said blades. Hence when the flap or baffle members 40 and 41 are extended the radially inner portion of the first stage compressor blades are ineffective and only the outer portions of said blades perform work in compressing the air. Also when said flap or baffle members are extended, the axial air flow velocity over the outer or working portions of the first stage blades is increased thereby minimizing any tendency of the working portions of said blades to stall.

In accordance with the present invention the air baffle or flap members 40 and 41 are automatically positioned by a governor mechanism so that said flap members are moved to their fully extended positions as soon as operation of the power plant 10 is initiated and said flap members remain in said extended position until the rotative speed of the compressor reaches a predetermined value of, for example, 6000 revolutions per minute (R. P. M.). As the compressor rotative speed exceeds this value the flap members 40 and 41 are progressively moved toward their retracted positions so that at a predetermined higher compressor rotative speed (for example 7000 R. P. M.) the flap members 40 and 41 are in their fully retracted position and said flap members remain in their fully retracted position at all higher compressor rotative speeds. The control mechanism for effecting this operation of the flap members 40 and 41 is diagrammatically illustrated in Figs. 2-5. Obviously the invention is not limited to the particular compressor rotative speeds mentioned. Thus the flap control mechanism can readily be made to keep the flaps in their fully extended position until any selected compressor rotative speed is attained and to effect complete retraction of the flap members at any higher selected speed.

Referring now to Figs. 2-5, each of the flap members 40 and 41 is operatively connected to a piston rod 50 of a piston 52, said piston being slidably mounted in a cylinder 54 such that said piston and cylinder constitute a hydraulic motor for operating the flap members 40 and 41. For simplicity, only one flap member 40 or 41 is illustrated in Figs. 2-5. The piston rod 50 also extends from the other end of the piston 52 and a spring 56 acts on said rod to urge the piston in a flap retracting direction. A servo-valve 58 controls the supply of a liquid under pressure to one end or the other of the cylinder 54. For this purpose the servo-valve 58 is slidable in an open ended cylinder 60 having an inlet port 62 and a pair of outlet ports 64 and 66 connected to opposite ends of the cylinder 54. The valve 58 has a pair of lands at its ends which, in the neutral position of said valve (Figs. 3-5), cover both of the outlet ports 64 and 66. A pump 68, which is arranged to be driven by the power plant 10, as schematically illustrated in Figs. 2-5 and as shown in detail in Fig. 8, supplies a liquid under pressure to the servo valve inlet port 62 whenever said power plant is operating. A pressure relief valve 70 controls the pressure of the liquid supplied by the pump 68 to the servo-valve 58.

The servo-valve 58 is pivotally connected to an intermediate portion of a walking beam 72 by a link 74 for controlling the position of said valve. One end of the beam 72 is positioned by a governor 76 having a rotatable drum 78 on which the governor flyweights 80 are pivotally mounted. The governor drum 78 has external gear teeth meshing with an engine driven gear 81 whereby the governor flyweights 80 rotate at a speed proportional to the rotative speed of the compressor 14. The driving connection between the governor and the engine is best seen in Figs. 8 and 9 and as there illustrated the gear 81 is driven from a gear 83 on an axial extension 85 of the compressor rotor, said extension being supported in a bearing 87. The flyweights 80 have arms 82 engaged under a slidable governor member 84 for raising said member against a spring 86 as the governor flyweights move radially outwardly in response to an increase in their rotative speed. The slidable governor member 84 is pivotally connected to one end of the walking beam 72 and the other end of said beam is pivotally connected to the piston rod 50.

In the following description of the operation of Figs. 2-5 the words "upper" and "lower" refer to the positions of the parts as viewed in these figures of the drawing. When the power plant 10 is shut down the spring 56 moves the flap members 40 and 41 to their fully retracted position as illustrated in Fig. 2. At the same time the servo-valve 58 and piston 52 are in their lowermost positions. When operation of the power plant 10 is initiated the pump 68 is rendered operative and its output liquid pressure is transmitted to the servo-valve inlet 62 and thence through the outlet port 66 to one end of the cylinder 54, the other end of said cylinder being vented through the servo-valve port 64. This liquid pressure moves the piston 52 in a direction to extend the flap members 40 and 41 by swinging the downstream ends of said members radially outwardly across the passage 34 about their upstream pivoted ends. As the flap members 40 and 41 are being extended by the piston 52, said piston also moves the walking beam 72 to raise the servo-valve 58 whereby said flap members are extended until they reach a position in which the servo-valve is moved to its neutral position as illustrated in Fig. 3. The flap members 40 and 41 are now in their fully extended position and as long as the servo-valve remains in its neutral position said flap members are hydraulically locked in this position. As the rotative speed of the compressor increases the flap members 40 and 41 and their control mechanism remain in the position illustrated in Fig. 3 until the force exerted by the governor flyweights 80 on the governor spring 86 increases to the point where said force just balances the compression preload of said spring. For example the pre-load compression of the governor spring 86 may be such that as the rotative speed of the compressor exceeds 6000 R. P. M. the flyweights exert sufficient force against the governor spring 86 to raise the slidable governor member 84. Hence any increment in speed of the compressor above 6000 R. P. M. results in the governor raising its end of the walking beam 72 an amount depending on the magnitude of said increment and therefore the servo-valve is moved upwardly from its neutral position a corresponding amount. As a result, liquid under pressure is now supplied to the upper side of the piston 52 to move the flap members 40 and 41 toward their retracted positions. This motion of the flap members results in a follow-up adjustment of the servo-valve to return said valve to its neutral position whereupon the position of the flap members is stabilized in a position intermediate its fully extended and retracted positions as in Fig. 4. Hence the extent of the retraction of the flap members 40 and 41 depends on how much the rotative speed of the compressor exceeds said predetermined value of 6000 R. P. M. At a certain higher value of compressor rotative speed, for example 7000 R. P. M., the flap members 40 and 41 are fully retracted as in Fig. 5. Any further increase in the compressor rotative speed would tend to further raise the servo-valve to admit liquid pressure to the upper end of the cylinder 54 to urge the flap members against their retracted positions. If the liquid pressure to the flap control mechanism should fail at any time, the spring 56 will immediately return the flap members to their retracted positions.

A valve 88 may be provided so that said valve can be opened to relieve any pressure in the lower end of the cylinder 54. With the valve 88, the flap members 40 and 41 can be retracted at any time by opening said valve 88 thereby overriding the governor control of said flap members.

As hereinafter described, the structure of the flap members 40 and 41 is such that they overlap each other in all positions of adjustment whereby in their extended positions they function as an annular air baffle to blank off the radially inner portions of the first stage compressor rotor blades and to divert the entire compressor air supply to the outer portions of said blades. Hence in the extended positions of the flap members 40 and 41 only the outer portions of the first stage blades work to compress the air and since the entire air supply flows over said outer or working portions of the first stage blades the air velocity over said blade working portions is increased by said extension thereby minimizing any tendency of said first stage blades to stall. Extension of the flap members 40 and 41 has a similar but lesser effect on the second stage compressor blades, and a still lesser effect on the more downstream compressor blade stages. Likewise, however, the tendency of the compressor blades to stall decreases in a downstream direction. Stalling of the compressor blades may lead to a compressor surge condition with resulting excessive blade vibration. Hence extension of the flap members 40 and 41 at low compression speeds is effective to minimize such excessive blade vibration.

The control mechanism for the flap members 40 and 41 is designed so that the flap members are extended at low compressor rotative speeds only so far as is necessary to prevent stall and resulting excessive vibration of the initial stage or stages of the compressor blades. Any further extension of said flap members would unnecessarily obstruct the compressor air flow. Preferably the flap members 40 and 41 block off no more than one-half the area of the annular inlet passage 34 in their extended position. In a particular gas turbine power plant it has been found that extension of the flap members 40 and 41 to block off approximately one-third of the area of the annular inlet passage 34 is sufficient to prevent excessive vibration of the initial stages of the compressor blades.

The operative connection between the flap actuating piston 52 and the flap members 40 and 41 is only schematically illustrated in Figs. 2–5. Figs. 6–7 are perspective views of a novel and compact embodiment of this connection and Figs. 8–14 illustrate the parts of Figs. 6–7 in more detail and also illustrate their compact arrangement in the power plant 10.

Referring now to Figs. 6–13, the piston 52 and cylinder 54 are disposed within the nose section 26 so that the axis of said piston and cylinder is parallel to but spaced from the axis of said nose section and so that said piston and cylinder lie just inside the flap members 40 and 41. A pair of annular rings 90 and 92 are co-axially mounted within the nose section adjacent to the downstream ends of the flap members. The rings 90 and 92 are supported by bearings 94 which permit rotation but prevent axial movement of said rings. A pair of links 96 and 98 are pivotally connected to the rings 90 and 92 respectively, said links extending rearwardly through an arcuate slot 100 in the ring 92. The outer ends of the links 96 and 98 are pivotally connected to a plate 102 which in turn is mounted on the end of the piston rod 50 of the piston 52. The piston rod 50 extends through an arcuate slot 104 in the ring 90 and through the slot 100 in the ring 92 and in addition the rod 50 is disposed between the pivotal connections of the links 96 and 98 to the rings 90 and 92.

Each of the flap members 40 and 41 is connected to the rings 90 and 92 by a separate pair of links 110 and 112 oppositely inclined to a mean radial direction between said links. Each link 110 has one end pivotally connected to the downstream end of a flap member and has its other end pivotally connected to the ring 90 while each link 112 has one end pivotally connected to the downstream end of a flap member and has its other end pivotally conected to the ring 92. As best seen in Figs. 8, 12 and 13 the pivotal connection of each end of the links 110 and 112 comprises a universal ball and socket connection.

With the aforedescribed construction of the connection between the piston 52 and the flap members 40 and 41, axial movement of the piston 52 produces opposite rotative movement of the rings. Thus motion of the piston 52 toward the rear end of its cylinder 54 produces clockwise motion of the ring 90 and counter-clockwise motion of the ring 92 as viewed in Figs. 6 and 7. This opposite motion of the rings 90 and 92 spreads the connections of each pair of links 110 and 112 to the rings 90 and 92 to retract the flap members 40 and 41. Likewise motion of the piston 52 toward the forward end of the cylinder 54 produces counterclockwise motion of the ring 90 and clockwise motion of the ring 92 thereby bringing together the connections of each pair of links 110 and 112 to said rings to extend the flap members 40 and 41. This operation is best understood from a comparison of Figs. 6 and 7.

At this point it should be noted that the actual pivotal connection of the walking beam 72 to the piston rod 50 is through a lateral extension 114 of said rod. This extension is illustrated in Figs. 9 and 14.

If the flap members 40 and 41, when extended, do not overlap circumferentially they would only partially blank off the radially inner portions of the first stage compressor blades. In that case said inner blade portions would still work on the compressor air and be subject to stall. Hence it is important that the flap members 40 and 41 closely overlap each other circumferentially in all positions of pivotal adjustment of said members to substantially shut off any airflow between said flap members. The details of each flap member 40 and 41 is best seen in Figs. 14–17. The flap members 40 and 41 are identical except for a slot in each member 40 for the passage of a strut 28 therethrough.

As best seen in Figs. 15–17, each flap member 40 comprises two flat side sections 122 each extending lengthwise along one edge of said member and interconnected by an arcuate intermediate section 124. The two flat side sections 122 of each flap member have co-axial hinge or pivot pins 128 at one end of said member and said flat sections have a tapering width which is a maximum at the opposite end of said member. In addition the two flat side sections of each member 40 are equally but oppositely inclined to the hinge or pivot axis of said member. Each flap member 40 also has an opening 130 to permit passage of the downstream portion of a strut 28 and said opening has a flange 132 along its edge to closely embrace said strut 28 in the extended position of the flap member. The intermediate section 124 of each flap member also has a pair of lugs 134 to which links 110 and 112 are pivotally connected.

Only those flap members straddling a strut 28 require an opening 130, the other flap members require no such opening and have been designated by reference character 41. Except for elimination of the opening 130 and its flange 132 the flap members 40 and 41 are identical as is apparent from a comparison of Figs. 17 and 18. Hence no further description of flap members 41 appears necessary.

The flap members 40 and 41 are pivotally mounted on the nose section 26 so that their flat side sections circumferentially overlap each other to form a continuation of the annular nose surface 30 when said members are retracted and to form a conical annular baffle surface when said members are extended. For this purpose hinge plates 136 are secured to said nose section, said plates having portions at least partially enveloping the hinge pins 128 to provide pivot bearings for said pins adjacent to said nose section surface 30, as illustrated in Figs. 8 and 9. As best seen in Fig. 9 each plate 136 provides a bearing for a pair of adjacent hinge pins 128 of adjacent flap members.

The flat side sections 122 of each flap member 40 and 41 are sufficiently wide that adjacent flat side sections of adjacent flap members overlap each other in all positions of pivotal adjustment of said flap members. In addition, each flat side section 122 and its overlapping flat side section are disposed in parallel contact with each other. Furthermore the operative connection to each flap member includes a pair of links 110 and 112 which are connected to said flap member at spaced points and are designed to prevent twisting of said flap member as it is pivotally adjusted whereby the flap members move parallel to themselves when they are pivotally adjusted. This means that each flat side 122 of a flap member is always parallel to and disposed in flat contact with its overlapping flat side of the adjacent flap member. Hence the flap members form a continuous annular surface in all positions of their pivotal adjustment.

As previously stated, the two flat side sections 122 of each flap member are equally but oppositely inclined to the hinge axis of its flap member. In addition each such flat side section is disposed parallel to its adjacent and overlapping flat side section. This means that the angle of inclination (as seen in Figs. 17 and 18) of each flat side section to the hinge axis of its flap member is equal to 360 degrees divided by twice the number of flap members 40 and 41.

The flap control mechanism schematically illustrated in Figs. 2–5 extends the flap members 40 and 41 when the engine starts and keeps the flap members fully extended until a predetermined rotative speed is attained. As the engine speed continues to increase said flap control mechanism progressively retracts the flap members until at a predetermined rotative higher speed the flap members are fully retracted and said flap members remain fully retracted at all higher rotative speeds. Because of the follow-up adjustment of the servo-valve 58, provided by the connection of the walking beam 72 to the piston 52, each rotative speed of the compressor between said predetermined values results in a definite flap position between its fully extended and retracted positions. Fig. 19 illustrates a modified flap control mechanism having a similar mode of flap regulation but in which the follow-up adjustment of the servo-valve is effected through the governor spring instead of by means of a walking beam.

For convenience of understanding, the parts of Fig. 19 corresponding to parts of Figs. 2–5 have been designated by the same reference numerals but with a subscript $a$ added. In Fig. 19 the movable member 84a of the governor 76a is directly connected to the servo-valve 58a. In addition instead of a walking beam 72 a lever 72a is connected to the piston 52a and the governor spring 86a acts against this lever. In this way the follow-up adjustment of the servo-valve 58a is effected by the governor spring 86a as a result of the motion of the lever 72a which takes place when the piston 52a moves to adjust the flap members 40a and 41a. The operation of the mechanism of Fig. 19 is otherwise like that of Figs. 2–5. It should be noted, however, that in Fig. 19, the follow-up motion of the servo-valve 58a is transmitted thereto from the piston 52a through the governor spring 86a. Because of this fact the control system of Fig. 19 may be subject to a vibration or hunting condition at certain operating conditions. This is not true of the control system of Figs. 2–5 because there the follow-up motion of the servo-valve 58 is independent of the governor spring.

Instead of the rotative speed of the compressor 14 some other condition indicative of compressor performance, such as the pressure rise across the compressor could be used to control the position of the flap members. Such a control mechanism is illustrated in Fig. 20. For convenience of understanding the parts of Fig. 20 corresponding to parts of Figs. 2–5 have been designated by the same reference numerals but with a subscript $b$ added thereto.

In Fig. 20 a pressure responsive device 140 has been substituted for the governor device 76 of Figs. 2–5. The pressure responsive device 140 comprises a housing divided into chambers 142 and 144 by a flexible diaphragm 146. A passage 148 communicates at one end with the chamber 142 and at its other end with a static pressure tube (not show) in the compressor inlet 34 so that the chamber 142 is subjected to the static pressure at the inlet of the air compressor 14. A passage 150 communicates at one end with the chamber 144 and at its other end with a static pressure tube (not shown) in the compressor outlet (preferably upstream of the burners 22 Fig. 1) so that the chamber 144 is subjected to the static pressure at the outlet of the compressor 14. In this way, the flexible diaphragm 146 is subjected to a fluid pressure differential proportional to the static pressure rise produced by the air compressor 14. This fluid pressure force is opposed by a spring 152. The diaphragm 146 is connected to one end of the walking beam 72b whereby the fluid pressure force on the flexible diaphragm 146 in Fig. 20 corresponds to the force exerted by the flyweights 80 on the governor member 84 against the governor spring 86 in Figs. 2–5. Hence the operation of Fig. 20 is essentially the same as that of Figs. 2–5 except in Fig. 20 the position of the air baffle flap members 40b and 41b is determined by the magnitude of the compressor pressure rise while in Figs. 2–5 the position of the flap members is determined by the magnitude of the rotative speed of the compressor. Accordingly no further description of Fig. 20 appears necessary. Obviously the pressure responsive device 140 could likewise be substituted in place of the governor 76a in Fig. 19.

The flap members 40 and 41 have been illustrated as pivotally supported at the inner wall 30 of the annular air inlet passage 34. In lieu of this construction, however, the flap members obviously could be supported at the radially outer wall 32 of said passage whereby when extended said flap members would block off the radially outer portions instead of the radially inner portions of the blades of the initial stage or stages of the compressor. However, because the circumferential velocity of each compressor blade is greatest at its radially outer end, this end of a compressor blade is less apt to stall than its radially inner end. Hence the arrangement illustrated, in which the flap members are pivotally connected to the inner wall 30 of the passage 34, is preferred.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In an axial flow air compressor having an air inlet structure with inner and outer annular walls forming an annular air inlet passage and having a plurality of rotor blades extending across said passage for supplying compressed air; the combination therewith of a plurality of extendible and retractible flap members disposed so that in their retracted positions they form a continuation of said inner wall immediately upstream of said compressor; means pivotally supporting each said flap member at its upstream end for pivotally extending the downstream end of said flap member part way across said annular passage to function as an air baffle for a portion of the adjacent blades of said compressor, each said flap member having means overlapping an adjacent flap member to form a circumferentially continuous surface in all positions of pivotal adjustment of said flap members; motor means operatively connected to said flap members and operable for adjusting the positions of said members; servo means operatively connected to said motor means for controlling the operation of said motor means, said servo means having a neutral position and being movable from said neutral position for effecting operation of said motor means; means responsive to a condition indicative of compressor performance and operatively connected to said servo means for displacing said servo means from said neutral position when said condition is below a predetermined value so as to cause operation of said motor means to extend said flap members to their maximum extent part way across said annular passage, and for displacing said servo means from said neutral position when said condition exceeds said predetermined value so as to cause operation of said motor means to retract said flap members such that said flap members are in their fully retracted position when said condition reaches a predetermined value higher than said first-mentioned predetermined value; and means interconnecting said servo means and flap members such that when said servo means is displaced from its neutral position to cause operation of said flap operating motor, the resulting motion of said flap members is effective through said interconnecting means to cause a follow-up adjustment of said servo means back toward its said neutral position whereby, intermediate said predetermined values, the extent of retraction of said baffle means depends on the extent said condition exceeds said first-mentioned predetermined value.

2. The combination recited in claim 1 in which each said flap member has an intermediate section and two flat side sections extending lengthwise from the pivoted end to the opposite end of said member with each flat side section being tapered so that its width is a maximum at said opposite end and with two flat side sections of said member being equally but oppositely inclined to the pivot axis of said member and with each of the flat side sections of said member being disposed parallel to and overlapping the adjacent flat side section of the adjacent flap member.

3. The combination recited in claim 1 in which the operative connection to each flap member includes a pair of equal length links inclined to each other and connected to said flap member at laterally spaced points to prevent twisting of said flap member.

4. The combination recited in claim 1 and including spring means operatively connected to said flap members for urging said flap members toward their retracted position.

5. In an air compressor having an air inlet structure with a pair of annular walls forming an annular air inlet passage and having a plurality of rotor blades extending radially across said passage for supplying compressed air; the combination therewith of means movably mounted adjacent to and upstream of said compressor for extension from one of said walls part way across said annular passage and for retraction toward said one wall, said means forming a substantially continuous annular air baffle for the adjacent compressor rotor blades in all positions of extension of said means; a motor operatively connected to said air baffle means and operable to effect extension and retraction thereof; servo-means having a neutral position and being operatively connected to said motor such that movement of said servo-means from said neutral position is effective to cause operation of said motor; means including a movable member responsive to a condition indicative of the performance of said air compressor; and a walking beam interconnecting said condition responsive member, servo-means and motor so that movement of said member is effective through said walking beam to cause movement of said servo-means from its neutral position and the resulting operation of said motor is effective through said walking beam to cause a follow-up movement of said servo-means back to its neutral position.

6. In combination; a body member having an annular surface subject to fluid flow thereover; a plurality of circumferentially overlapping flap members; means pivotally connecting one end of each flap member to said body member adjacent to said body member surface for co-action with said fluid, said means connecting said flap members to said body member for pivotal adjustment about an axis perpendicular to a plane including the axis of said surface; means operatively connected to said flap members for simultaneous and equal pivotal adjustment of said flap members about their respective pivot axes; each said flap member having an intermediate section and two flat side sections extending lengthwise from the pivoted end to the opposite end of said member with each said flat side section being tapered so that its width is a maximum at said opposite end of its flap member, the two flat sections of each flap member being equally but oppositely inclined to the pivot axis of said member and each flat section of a flap member being disposed parallel to and in overlapping contact with the adjacent flat section of the adjacent flap member.

References Cited in the file of this patent

UNITED STATES PATENTS

| 127,915 | Nutter | June 11, 1872 |
| 1,835,811 | Pugsley | Dec. 8, 1931 |
| 2,570,847 | Ovens | Oct. 9, 1951 |
| 2,613,029 | Wilde | Oct. 7, 1952 |
| 2,689,680 | Lovesey | Sept. 21, 1954 |
| 2,705,590 | Lovesey et al. | Apr. 5, 1955 |

FOREIGN PATENTS

| 30,289 | France | Dec. 31, 1925 |
| | (Addition to No. 600,436) | |
| 260,995 | Italy | Oct. 25, 1928 |
| 951,944 | France | Apr. 25, 1949 |
| 1,010,604 | France | Mar. 26, 1952 |